United States Patent
Haensgen et al.

(10) Patent No.: US 10,108,238 B2
(45) Date of Patent: *Oct. 23, 2018

(54) INTELLIGENT POWER TAP FOR PROVIDING POWER AND COMMUNICATING IN INDUSTRIAL AUTOMATION APPLICATIONS

(71) Applicant: Rockwell Automation Technologies, Inc., Mayfield Heights, OH (US)

(72) Inventors: Steven T Haensgen, Mukwonago, WI (US); John P Caspers, Racine, WI (US); Yutao Wang, Brookfield, WI (US); Jeffrey A Kilburn, Hartland, WI (US); Darryl E Whitley, Milwaukee, WI (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 44 days.

This patent is subject to a terminal disclaimer.

(21) Appl. No.: 15/217,352

(22) Filed: Jul. 22, 2016

(65) Prior Publication Data

US 2018/0024604 A1    Jan. 25, 2018

(51) Int. Cl.
*G06F 1/26* (2006.01)
*G06F 13/36* (2006.01)
(Continued)

(52) U.S. Cl.
CPC ......... *G06F 1/266* (2013.01); *G05B 19/0425* (2013.01); *G05B 19/418* (2013.01);
(Continued)

(58) Field of Classification Search
CPC ............................. G06F 1/266; G06F 13/362
See application file for complete search history.

(56) References Cited

U.S. PATENT DOCUMENTS

| 4,095,862 A | 6/1978 | Hatch |
| 4,252,396 A | 2/1981 | Wilson |

(Continued)

FOREIGN PATENT DOCUMENTS

| CN | 2648674 | 10/2004 |
| EP | 1967929 A2 | 10/2008 |

(Continued)

OTHER PUBLICATIONS

Siemens, Simatic Net, AS-Interface—Introduction and Basics Manual, Release Apr. 2006, 62 pages.

(Continued)

*Primary Examiner* — Stefan Stoynov
(74) *Attorney, Agent, or Firm* — Quarles & Brady LLP

(57) ABSTRACT

Systems and methods for providing diagnostic information by an intelligent power tap is disclosed. The power tap includes a circuit board and a microcontroller disposed on the circuit board. The microcontroller is configured to provide a status report of the intelligent power tap. The power tap further includes a physical layer network interface connected to the microcontroller and the physical network. The intelligent power tap is configured to inject at least one of a network power and a switched power into the network system.

14 Claims, 6 Drawing Sheets

(51) Int. Cl.
*G06F 13/362* (2006.01)
*G05B 19/042* (2006.01)
*G05B 19/418* (2006.01)
*H02J 1/08* (2006.01)
*H02J 13/00* (2006.01)

(52) U.S. Cl.
CPC .............. *G06F 13/362* (2013.01); *H02J 1/08* (2013.01); *H02J 13/0003* (2013.01)

(56) References Cited

U.S. PATENT DOCUMENTS

| | | | |
|---|---|---|---|
| 4,359,257 | A | 11/1982 | Lopinski et al. |
| 4,641,904 | A | 2/1987 | Kosugi et al. |
| 4,773,876 | A | 9/1988 | Nakamura et al. |
| 5,059,137 | A | 10/1991 | Dale et al. |
| 5,242,313 | A | 9/1993 | Logerot et al. |
| 5,242,314 | A | 9/1993 | Di Giulio et al. |
| 6,074,238 | A | 6/2000 | DeRoss et al. |
| 6,232,557 | B1 | 5/2001 | Lounsbury et al. |
| 6,394,833 | B1 | 5/2002 | Bulmer et al. |
| 6,400,103 | B1 | 6/2002 | Adamson |
| 6,425,770 | B1 | 7/2002 | Lostoski et al. |
| 6,442,144 | B1 | 8/2002 | Hansen et al. |
| 6,732,202 | B1 | 5/2004 | Ying |
| 6,935,885 | B2 | 8/2005 | Scherer et al. |
| 7,080,150 | B1 | 7/2006 | Wehrle et al. |
| 7,112,073 | B2 | 9/2006 | Morlok |
| 7,228,363 | B1 | 6/2007 | Wehrle et al. |
| 7,313,607 | B1 | 12/2007 | Rosenberg |
| 7,412,530 | B1 | 8/2008 | Wehrle et al. |
| 7,483,396 | B2 | 1/2009 | Steindl |
| 7,721,079 | B2 | 5/2010 | Wehrle et al. |
| 8,433,827 | B2 | 4/2013 | Biehler |
| 9,813,290 | B2 | 11/2017 | Saltsidis |
| 9,876,674 | B1 | 1/2018 | Murray et al. |
| 2002/0184573 | A1 | 12/2002 | Rousseau et al. |
| 2004/0158713 | A1 | 8/2004 | Aneweer et al. |
| 2005/0024026 | A1 | 2/2005 | Hung et al. |
| 2005/0021738 | A1 | 4/2005 | Goeller et al. |
| 2005/0243739 | A1 | 11/2005 | Anderson et al. |
| 2005/0262218 | A1 | 11/2005 | Cox et al. |
| 2008/0192650 | A1 | 11/2008 | Kolhi |
| 2008/0281947 | A1 | 11/2008 | Kumar |
| 2009/0198385 | A1 | 8/2009 | Oe et al. |
| 2009/0205022 | A1 | 8/2009 | Sanchez et al. |
| 2010/0030345 | A1 | 2/2010 | Cole et al. |
| 2010/0186229 | A1 | 7/2010 | Enomoto et al. |
| 2010/0205271 | A1 | 8/2010 | Porter et al. |
| 2010/0205281 | A1 | 8/2010 | Porter et al. |
| 2011/0222200 | A1* | 9/2011 | Fuller .................... H01H 9/548 361/100 |
| 2012/0066356 | A1 | 3/2012 | Nguyen et al. |
| 2012/0253540 | A1 | 10/2012 | Coyne |
| 2012/0258726 | A1 | 10/2012 | Bansal et al. |
| 2013/0073760 | A1 | 3/2013 | Wiesgickl |
| 2013/0275566 | A1 | 10/2013 | Huth et al. |
| 2013/0288640 | A1 | 10/2013 | Bonner |
| 2014/0258455 | A1 | 9/2014 | Julicher |
| 2014/0280881 | A1 | 9/2014 | Szamonek et al. |
| 2015/0117244 | A1 | 4/2015 | Williamson |
| 2015/0201101 | A1 | 7/2015 | Kaminushi |
| 2015/0256389 | A1 | 9/2015 | Ruess et al. |
| 2015/0350229 | A1 | 12/2015 | Mitchell |
| 2016/0013948 | A1 | 1/2016 | Moses |
| 2016/0070282 | A1 | 3/2016 | Chapel et al. |
| 2016/0139999 | A1 | 5/2016 | Gabler et al. |
| 2016/0006628 | A1 | 7/2016 | Herring et al. |
| 2016/0269373 | A1 | 9/2016 | White et al. |
| 2017/0025892 | A1* | 1/2017 | Van Ostrand ...... G01R 19/2513 |
| 2017/0026441 | A1 | 1/2017 | Moudy et al. |
| 2017/0134477 | A1 | 7/2017 | Ben Dayan |
| 2017/0237556 | A9 | 8/2017 | Denning et al. |
| 2017/0272452 | A1 | 9/2017 | Kraemer et al. |
| 2017/0303079 | A1 | 10/2017 | Ikemoto et al. |

FOREIGN PATENT DOCUMENTS

| | | |
|---|---|---|
| EP | 1983616 A2 | 10/2008 |
| GB | 2442304 B | 10/2008 |
| KR | 1020110017576 A | 2/2011 |
| WO | 03023634 A1 | 3/2003 |
| WO | 2006089718 A2 | 8/2006 |
| WO | 2009150527 A1 | 12/2009 |

OTHER PUBLICATIONS

European Search Report; Appln No. 17177835.0-1804; dated Jan. 2, 2018; 11 pages.
Anderson, Paul M, et al, Automated Power Distribution System Hardware, Aug. 6, 1989, pp. 579-584.
CN2648674, Machine translated English abstract, 1 page.
Brian Burgess: "How to Assign a Static IP Address in Windows 7, 8, 10, XP, or Vista", Nov. 10, 2013 (Nov. 10, 2013), pp. 1-17, XP055427798, Retrieved from the Internet: URL:https://www.howtogeek.com/howto/19249/how-to-assign-a-static-ip-address-in-xp-vista-or-windows-7/ [retrieved on Nov. 22, 2017]* the whole document*.
Glenn Satchell: "How can I configure a DHCP server to assign addresses based on the OS that is running", May 21, 2010 (May 21, 2010), pp. 1-9, XP055427854, Retrieved from the Internet: URL:https://lists.isc.org/pipermail/dhcp-users/2010-May/011783.html [retrieved on Nov. 22, 2017]*the whole documen*.
Peter Matray et al: "On the network geography of the Internet", INFOCOM, 2011 Proceedings IEEE, IEEE, Apr. 10, 2011 (Apr. 10, 2011, pp. 126-130, XP031953298, DOI: 10.1109/INFCOM.2011.5934909 IBSN: 978-1-42244-9919-9 *abstract; figure 1*.
European Search Report; Appln No. 17178258.4-1808; dated Dec. 20, 2017; 9 pages.
Moyne, et al., The Emergence of Industrial Control Networks for Manufacturing Control, Diagnostics, and Safety Data, Proceedings of the IEEE, 2007, 95(1):29-47.
European Patent Office, Extended European Search Report, EP 17178251.9, dated Sep. 27, 2017; 8 pages.
European Patent Office, Partial European Search Report, EP 17178252.7, dated Jan. 3, 2018, 15 pages.
European Patent Office, Extended European Search Report, EP 17178252.7, dated Mar. 27, 2018; 18 pages.
European Patent Office, Extended European Search Report, EP 17178254.3, dated Oct. 5, 2017, 8 pages.
European Patent Office, Extended European Search Report, EP 17178256.8, dated Nov. 30, 2017, 7 pages.

* cited by examiner

INTELLIGENT POWER TAP FOR PROVIDING POWER AND COMMUNICATING IN INDUSTRIAL AUTOMATION APPLICATIONS

BACKGROUND

The subject matter disclosed within relates generally to a device in a control system, and more particularly to an intelligent power tap for providing power and communicating in industrial automation applications.

Control systems are at the core of modern manufacturing. These systems control diverse processes from steel and automotive products to mass distribution products associated with food and beverages, for example. In general, control systems require a processor and related program to direct a related system of Input/Output (I/O) interfaces (e.g., I/O modules) which in turn report and control industrial processes. I/O modules may be selected to perform digital style (e.g., 120V input/output) and/or analog style control (e.g., 4-20 ma input/output), for example. Also, generally associated with control systems are related racks, power supplies and control networks for housing, powering, and communicating with the associated I/O modules.

Over time, industrial system demands have steadily increased. For example, system demands for lower costs and increased flexibility are increasingly necessary for modern factories to compete on the global stage. Lower system costs provide manufacturers with a competitive advantage by realizing a better return on capital investments. Flexibility enables a manufacturer to respond to changing market dynamics as product and sales requirements change. Unfortunately, conventional systems many times are burdensome to install/upgrade and often require manufacturer's to install more system components than necessary. Thus, conventional systems generally do not provide the requisite flexibility and associated lower costs required by modern systems.

One of the solutions that addresses the above increased demands is the emergence of industrial control networks for communicating control and status data between industrial controllers and devices used in control systems such as I/O devices, motor starters, relays, push buttons, drives, etc. These industrial control networks can help reduce wiring costs, and provide requisite flexibility when system upgrades are required.

However, in many industrial control network systems, inefficiencies still exist when required to connect or wire a power source to each device within the control system. In such systems, a power tap can be used to inject either a network or switched power (often referred to as control power) onto the system communication cable, thereby powering all aspect of devices within the system.

However, in existing industrial control network systems, the power tap providing power to nodes in control systems is not smart and cannot provide required information to diagnose system related problems. Thus, there is a need for providing an intelligent power tap.

BRIEF SUMMARY OF THE INVENTION

The above problems can be solved by providing an intelligent power tap for providing power and communicating in industrial automation applications.

In one aspect, an intelligent power tap is provided in a network system. The intelligent power tap includes a circuit board; a microcontroller disposed on the circuit board, where the microcontroller is configured to provide a status report of the intelligent power tap. The intelligent power tap further includes a physical layer network interface connected to the microcontroller and the network system. The intelligent power tap is configured to inject at least one of a network power and a switched power into the network system.

In some embodiments, the intelligent power tap further comprises a first filter circuit connecting an intelligent power tap voltage supply input to the network power output; and a second filter circuit connecting the intelligent power tap voltage supply input to the switched power output.

In some embodiments, the intelligent power tap further comprises a first current limit circuit connected to the first filter circuit and the network power output, where the first current limit circuit allows a first pre-defined excessive network output current during brief periods of high current demand; and a second current limit circuit connected to the second filter circuit and the switched power output, where the second current limit circuit allows a second pre-defined excessive switched output current during brief periods of high current demand.

In some embodiments, the intelligent power tap further comprises a current limit circuit that limits output current from the intelligent power tap within an adjustable current threshold.

In another aspect, the present disclosure provides a system. The system includes a network power zone including one or more devices. The system also includes a switched power zone including one or more devices, and an intelligent power tap. The intelligent power tap is configured to inject network power to the network power zone and switched power to the switched power zone. The system further includes a master device which can communicate to the intelligent power tap, where the intelligent power tap is configured to provide the geographical location on the system of the intelligent power tap to the master device.

In some embodiments, the intelligent power tap is further configured to provide diagnostics information to the master device in real time.

In some embodiments, the microcontroller is configured to send prognostics information to the master device.

In yet another aspect, the present disclosure provides a method. In the method, an intelligent power tap is connected to a control network system, where the intelligent power tap includes a voltage sensor to measure its incoming voltage supply. The intelligent power tap sends a first warning to the control network system when determining the incoming voltage is not within a first preset voltage range.

In some embodiments, the method further comprises obtaining, by the intelligent power tap, at least one of an outgoing network current and an outgoing switched current to be injected into the one or more control devices; and generating a fourth warning for the control network system when determining that the outgoing network current or the outgoing switched current is not within a current range determined by current needs of the downstream devices.

In some embodiments, the method further comprises reporting a geographical location of the intelligent power tap to the control network system when sending at least one of the first warning, the second warning, the third warning, and the fourth warning.

These and other benefits may become clearer upon making a thorough review and study of the following detailed description. Further, while the embodiments discussed above can be listed as individual embodiments, it is to be understood that the above embodiments, including all elements contained therein, can be combined in whole or in part.

BRIEF DESCRIPTION OF DRAWINGS

The disclosure will be better understood and features, aspects and advantages other than those set forth above will become apparent when consideration is given to the following detailed description thereof. Such detailed description makes reference to the following drawings.

Figure 1:
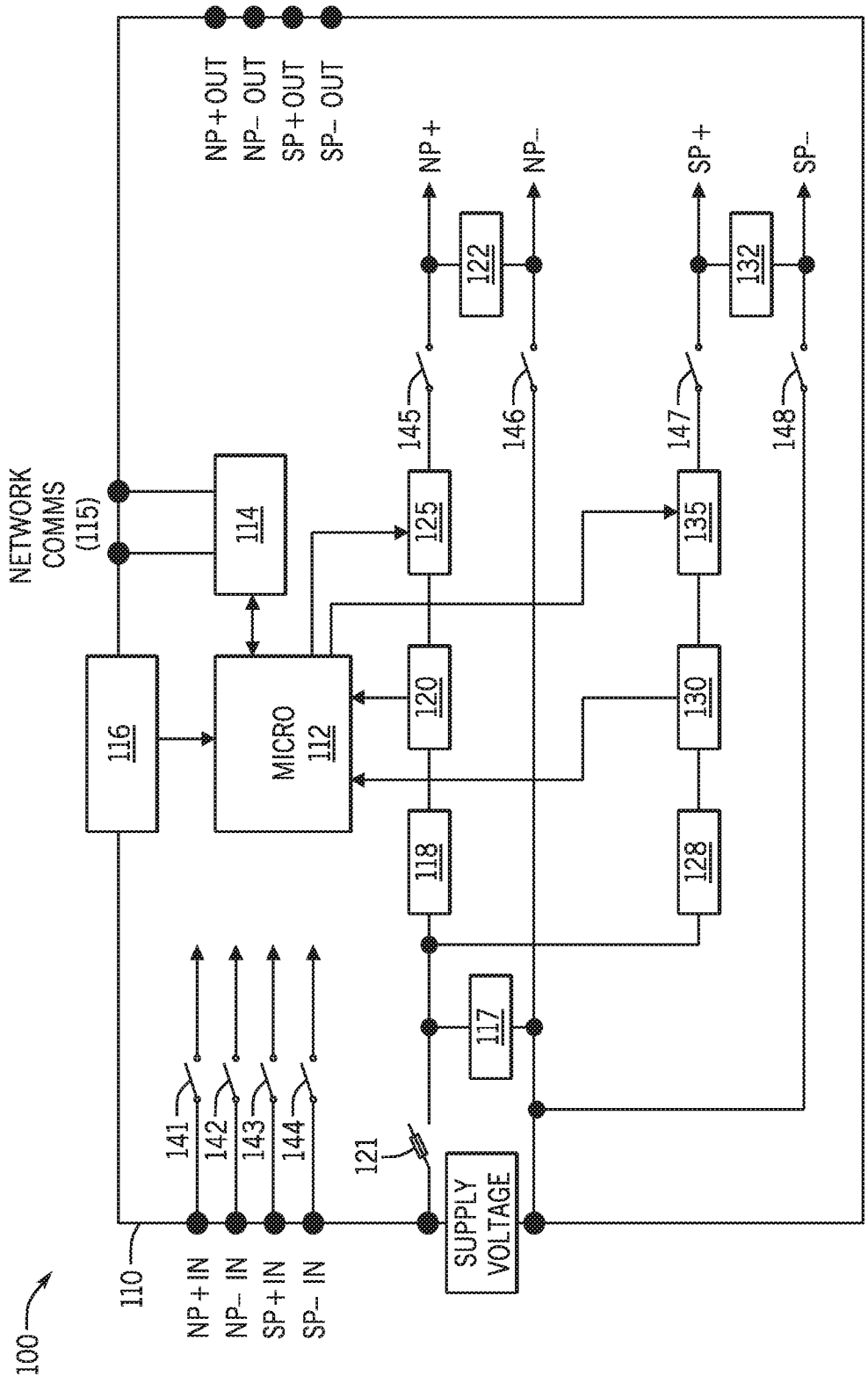
FIG. 1 illustrates an example intelligent power tap according to one or more embodiments of the instant application.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION OF THE INVENTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the use the phraseology and terminology used herein is for the purpose of description and should not be regarded as limiting. Furthermore, the use of "right", "left", "front", "back", "upper", "lower", "above", "below", "top", or "bottom" and variations thereof herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may include used herein to describe various information, the information should not be limited by these terms. These terms are only used to distinguish one category of information from another. For example, without departing from the scope of the present disclosure, first information may include termed as second information; and similarly, second information may also be termed as first information. As used herein, the term "if" may include understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may include combined in any suitable manner.

The following discussion is presented to enable a person skilled in the art to make and use embodiments of the disclosure. Various modifications to the illustrated embodiments will be readily apparent to those skilled in the art, and the generic principles herein can be applied to other embodiments and applications without departing from embodiments of the disclosure. Thus, embodiments of the disclosure are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the disclosure. Skilled artisans will recognize the examples provided herein have many useful alternatives and fall within the scope of embodiments of the disclosure.

FIG. 1 illustrates an example intelligent power tap according to one or more embodiments of the instant application. In FIG. 1, the intelligent power tap 100 may be connected to a network system. The intelligent power tap 100 includes a circuit board 110, a microcontroller 112 disposed on the circuit board 110, and a physical layer network interface 114 connected to the microcontroller 112 and the network system. The circuit board 110 may include one or more layers of printed circuit boards (PCB). The microcontroller 112 may include one or more central processing units, which may also be referred as microprocessor, or host processor, etc. Generally, the microcontroller 112 decides what the received messages mean, what messages it wants to transmit, and what acts to be performed after receiving a certain message.

For example, the physical layer network interface 114 may be connected to a control network system via the Network communication terminals 115 of the intelligent power tap 100. When receiving a request to provide a status report to another device on the control network system, the microcontroller 112 may send a status report to the requesting device.

The microcontroller 112 communicates as a network node via the network bus connected to a physical layer of the network system. The microcontroller 112 is configured to allow the geographical location on the network system of the intelligent power tap to be determined in the network system. Here, the geographical location may indicate a relative location of the intelligent power tap 100 on the network system using one of the control device in the network system as a reference starting location. For example, the geographical location may indicate the left-to-right sequential location of the device on the network cable. The microcontroller 112 is configured to provide a status report of the intelligent power tap 100, where the status report includes the geographical location and other information. The intelligent power tap 100 is configured to inject at least one of a network power and a switched power into the network system. The network power may be injected with a voltage supply, such as 24 Vdc, and a maximum current, such as 4 A via the intelligent power tap 100, which may be used to power communication electronics, Inputs/Outputs, and etc. The switched power may be injected with a voltage supply, such as 24 Vdc, and a maximum current, such as 4 A via the intelligent power tap 100 as well. The switched power may be used to power contactors, relays, and other switching devices/circuits. In this disclosure, the voltage supply may include an AC input when the intelligent power tap 100 includes a switch mode power supply that converts the AC to 24 Vdc.

The microcontroller 112 may be connected to a first voltage sensor 117, a second voltage sensor 122, and a third voltage sensor 132. The first voltage sensor 117 senses an incoming voltage to the intelligent power tap 100. The second voltage sensor 122 senses a network voltage to be injected into the network system. The third voltage sensor 132 senses a switched voltage to be injected into the network system. The intelligent power tap 100 may include additional voltage sensors to measure other voltage signals in the intelligent power tap 100.

The first voltage sensor 117 may be connected between the incoming supply voltage terminals. Alternatively, the first voltage sensor 117 may be connected to a fuse holder 121 that holds a replaceable fuse connected to the voltage input, which may be a 24V voltage input that provides power to the microcontroller 112, the network power, and the switched power.

As shown in FIG. 1, the intelligent power tap 100 includes four power input terminals ($NP+_{IN}$, $NP-_{IN}$, $SP+_{IN}$, $SP-_{IN}$) and four power output terminals ($NP+_{OUT}$, $NP-_{OUT}$, $SP+_{OUT}$, $SP-_{OUT}$). The input power terminal $NP+_{IN}$ is an input network power, the input power terminal $NP-_{IN}$ is a ground terminal for the input network power. The input power terminal $SP+_{IN}$ is an input switched power and the terminal $SP-_{IN}$ is a ground terminal for the input switched power. Correspondingly, the output power terminal $NP+_{OUT}$ is an output network power, the output power terminal $NP-_{OUT}$ is a ground terminal for the output network power. The output power terminal $SP+_{OUT}$ is an output switched power and the terminal $SP-_{OUT}$ is a ground terminal for the output switched power.

The intelligent power tap 100 further includes a selector 116 connected to the microcontroller or between the input power terminals ($NP+_{IN}$, $NP-_{IN}$, $SP+_{IN}$, $SP-_{IN}$) and the output power terminals ($NP+_{OUT}$, $NP-_{OUT}$, $SP+_{OUT}$, $SP-_{OUT}$). The selector 116 may be a dip switch, a rotary switch, etc. By configuring the selector 116, the intelligent power tap 100 may be configured to work in one of the following four modes.

In the first mode, the intelligent power tap 100 works as a first tap (e.g. 250 in FIG. 2), which injects network power 210 left (to the bridge or 202 shown in FIG. 2) and right (to downstream nodes) and switched power 220 to right (to downstream nodes). The first power tap 250 injects switched power 220 for a switched power zone that supplies switched power for the relays 260 in the system. It also injects network power 210 for a network power zone that supplies network power for the bridge 202, relays 260, and motor starters 262 in the system.

In the second mode, the intelligent power tap 100 works as a network power tap and a switched power tap (e.g. 256 in FIG. 2), which injects network power 280 and switched power 240 to right. The network and switched power tap 256 injects switched power 240 and network power 280 for a safety power zone to supply power for safety components 268 in the system.

In the third mode, the intelligent power tap 100 works as a network power tap only (e.g. 254 in FIG. 2), which injects network power 270 to right. The network power tap 254 injects network power 270 for a network power zone that supplies network power for the pushbuttons 264 in the system.

In the fourth mode, the intelligent power tap 100 works as a switched power tap (e.g. 252 in FIG. 2), which injects switched power 230 to right. The switched power tap 252 injects switched power 230 for a switched power zone to supply switched power for motor starters 262 and pushbuttons 264 in the system.

The intelligent power tap 100 may also include one or more current sensors. For example, the intelligent power tap 100 includes a current sensor 120 or 130 that senses at least one of a network current and a switched current to be injected into the network system. The first current sensor 120 is connected to a filter circuit 118 and a first switch 125 to shut off the network power. The current sensor 120 also sends the measured current signal to the microcontroller 112. The second current sensor 130 is connected to a second filter circuit 128 and a second switch 135 to shut off the switched power output. The second current sensor 130 also sends the measured current signal to the microcontroller 112. For example, the first switch 125 is configured to shut off the network power that is injected into the network system for a network power zone based on a first command received from the microcontroller. The second switch 135 is configured to shut off the switched power that is injected into the network system for a switched power zone based on a second command received from the microcontroller.

The intelligent power tap 100 may also include current limit circuits in the current sensors 120 and 130. For example, the first current sensor 120 includes a first current limit circuit connected to the first filter circuit and the network power output, where the first current limit circuit allows a first pre-defined excessive network output current during brief periods of high current demand. The second current sensor 130 includes a second current limit circuit connected to the second filter circuit and the switched power output, where the second current limit circuit allows a second pre-defined excessive switched output current during brief periods of high current demand.

The intelligent power tap 100 further includes a plurality of switches 141, 142, 143, and 144 connected to the input power terminals ($NP+_{IN}$, $NP-_{IN}$, $SP+_{IN}$, $SP-_{IN}$) and the output power terminals ($NP+_{OUT}$, $NP-_{OUT}$, $SP+_{OUT}$, $SP-_{OUT}$). The switches 141 and 142 determines whether to connect network power input terminals $NP+_{IN}$, $NP-_{IN}$ directly to network power output terminals $NP+_{OUT}$, $NP-_{OUT}$ and thus bypassing the power tap injection circuitry. The switches 143 and 144 determines whether to connect switched power input terminals $SP+_{IN}$, $SP-_{IN}$ directly to switched power output terminals $SP+_{OUT}$, $SP-_{OUT}$ and thus bypassing the power tap injection circuitry.

The intelligent power tap 100 may further include a plurality of switches 145, 146, 147, and 148 connected to the power injection terminals (NP+, NP−, SP+, SP−). The switches 145 and 146 determine whether to inject network power while the switches 147 and 148 determine whether to inject switched power.

Figure 2:
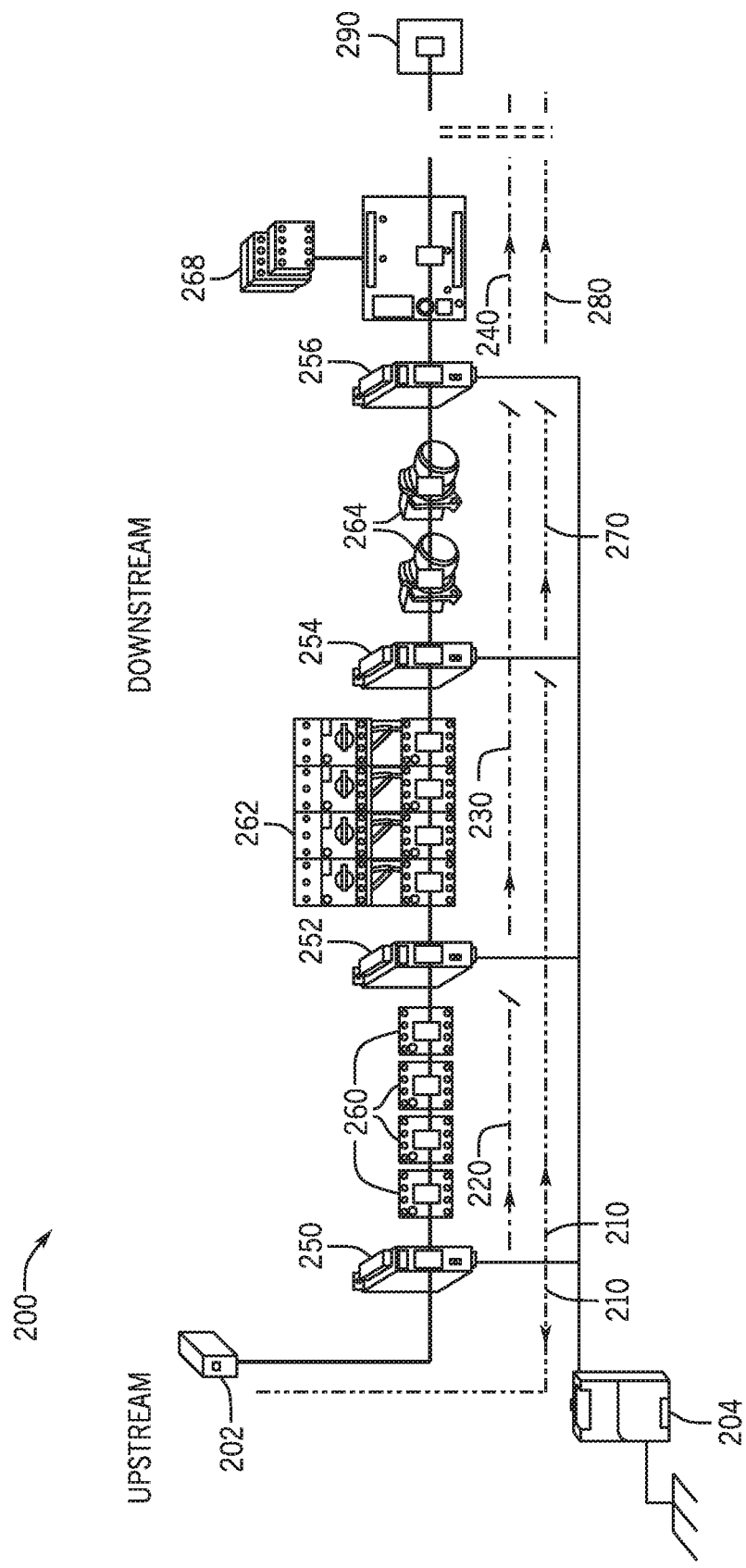
FIG. 2 illustrates an example system according to one or more embodiments of the instant application.

FIG. 2 illustrates an example system 200 according to one or more embodiments of the instant application. The system 200 includes a network power zone 210 and a switched power zone 220. The system 200 may include additional switched power zones 230 and 240. The switched power zones may not overlap with each other. The network power zone 210 may overlap with one of the switched power zones 220, 230, or 240. The network power zone 210 includes one or more devices such as power taps 250, 252, relays 260, and starters 262. In FIG. 2, push buttons 264, safety node 268, power taps 254 and 256 and terminator 290 are in different network power zones from zone 210. The system 200 may also include additional switched power zones (e.g. 230 and 240) which may not overlap with each other, but may overlap with any network power zones.

The system 200 may further include an intelligent power tap 250, 252, 254 or 256, which may be configured to inject network power to the network power zone and switched power to the switched power zone. A master device 202 can communicate to the intelligent power tap, such as 250, which is configured to provide geographical location of the intelligent power tap 250 to the master device 202.

The intelligent power tap 250 has a similar structure as the power tap 100 shown in FIG. 1, which includes a circuit board; a microcontroller disposed on the circuit board; and a physical layer network interface connected to the microcontroller and a physical network. Further, the intelligent power tap 252, 254 and 256 may be configured to inject network power or switched power only. Each of the intelligent power taps 250, 252, 254 and 256 is further configured to provide diagnostics information to the master device in real time. The microcontroller is configured to send prognostics information to the master device 202 when receiving a request from the master device 202, or on a routine basis.

Figure 3:
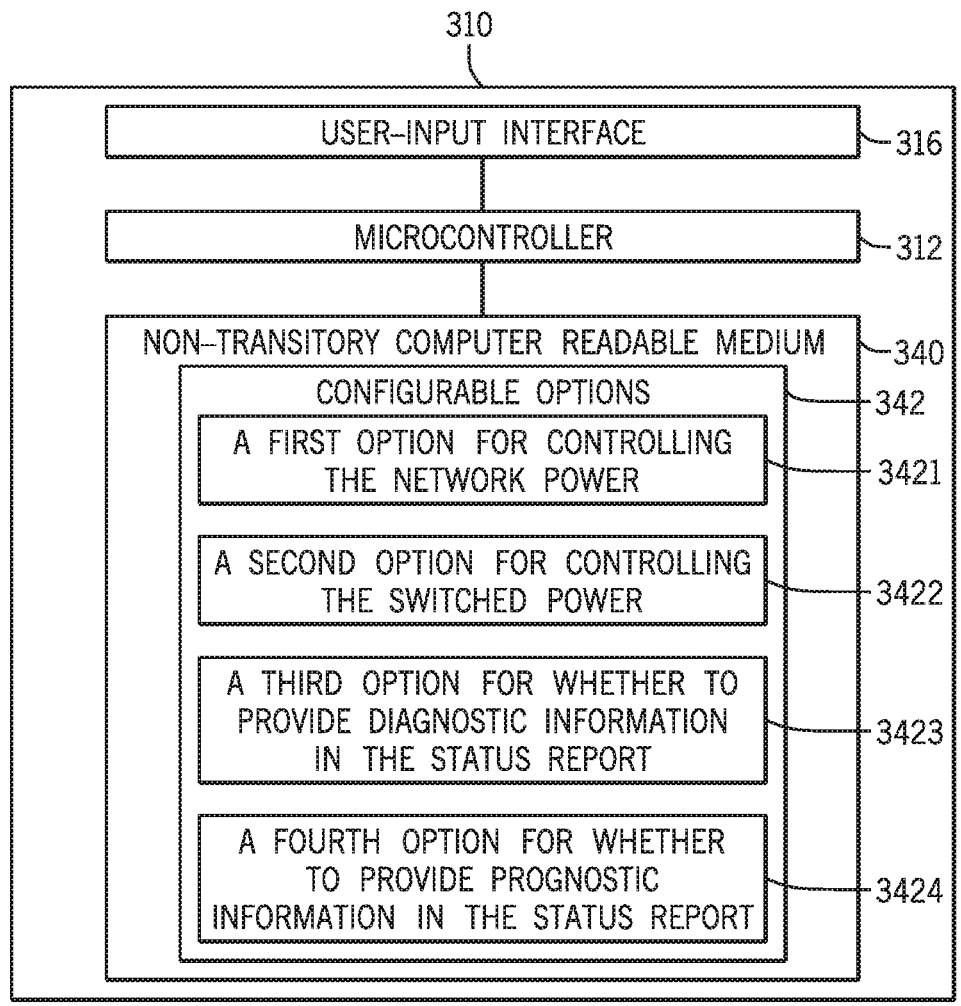
FIG. 3 illustrates an example tap according to one or more embodiments of the instant application.

FIG. 3 illustrates an example intelligent power tap 310 according to one or more embodiments of the instant application. The example intelligent power tap 310 includes a microcontroller 312 and a non-transitory storage computer readable medium 340, which include a plurality of configurable options 342. For example, the configurable options 342 may include one or more options that are configurable over the network system.

In FIG. 3, the options 342 include at least one of the following options: a first option 3421 for controlling the network power; a second option 3422 for controlling the switched power; a third option 3423 for whether to provide diagnostic information in the status report; and a fourth option 3424 for whether to provide prognostic information in the status report.

When the first option 3421 is selected, the microcontroller 312 may receive additional configuration from a master device enabling it to decide whether to shut off the network power based via switch 125 in FIG. 1 on the received additional parameter. When the second option 3422 is selected, the microcontroller 312 may receive additional configuration from a master device enabling it to decide whether to shut off the switched power via the second switch 135 in FIG. 1 based on the received additional configuration.

When the third option 3423 is selected, the microcontroller 312 may receive diagnostic information from one or more sensors in the example tap 310 and then provide diagnostic information in the status report to a master device or a node. When the fourth option 3424 is selected, the microcontroller 312 may receive diagnostic information from one or more sensors in the example tap 310 and then provide prognostic information in the status report to a master device or a node.

The prognostics information may include at least one of the following: an over-voltage warning when at least one of the network voltage and the switched voltage is greater than a preset upper voltage limit; an under-voltage warning when at least one of the network voltage and the switched voltage is lower than a preset lower voltage limit; an over-current warning when at least one of the network current and the switched current is greater than a preset upper current limit; and an under-current warning when at least one of the network current and the switched current is lower than a preset lower current limit. The prognostics information may also include an over-current warning based on a self identification of the zone devices and their current characteristics.

The example tap 310 may also include a user-input interface 316 configured to receive current characteristics of a zone device, where the prognostics information may include: a second over-current warning based on the current characteristics of the zone device provided via the user-input interface.

Figure 4:
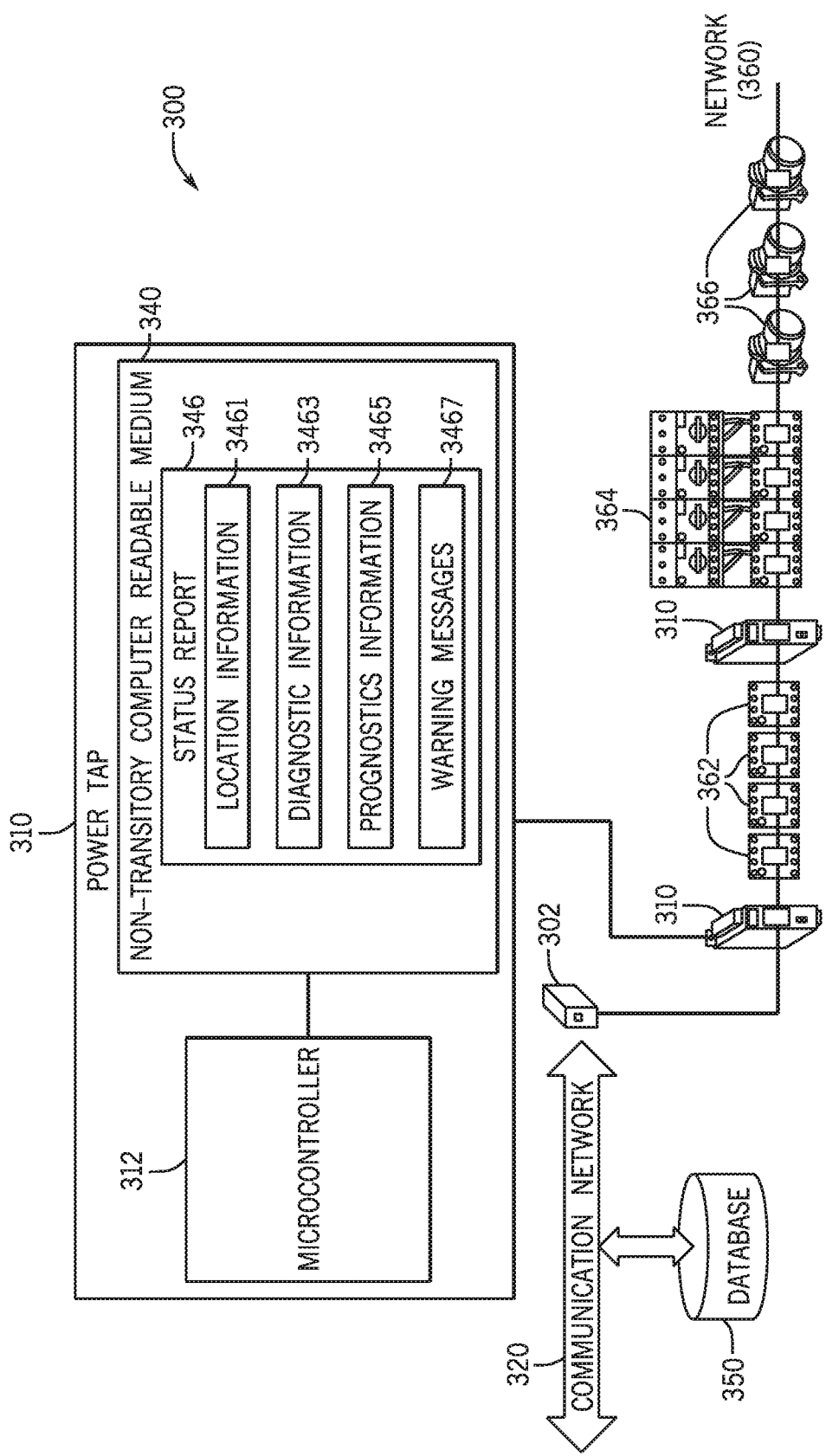
FIG. 4 illustrates an example network system according to one or more embodiments of the instant application.

FIG. 4 illustrates an example network system 300 according to one or more embodiments of the instant application. The network system 300 includes a network 360 consisting of a power tap 310. The power tap 310 includes a microcontroller 312 and a non-transitory computer readable medium 340. The communication network 320 may also be connected to a database 350 to record the usage information, diagnostic information, and prognostic information from the power tap 310.

Here, the power tap 310 may provides a status report 340 to one or more nodes in the network 360, which include a plurality of network nodes including relays 362, starter 364, etc. The power tap 310 also provides a status report to a communications bridge 302, which makes the information available to the communication network 320 so that the information may be stored in a database 350. The status report 340 includes location information 3461, diagnostic information 3463, prognostics information 3465, and one or more warning messages 3467.

For example, the prognostics information 3465 may include an over-current warning based on a self identification of a zone device and its current characteristics. The prognostics information 3465 may further include a second over-current warning based on the current characteristics of the applicable zone devices provided via the user-input interface.

Figure 5:
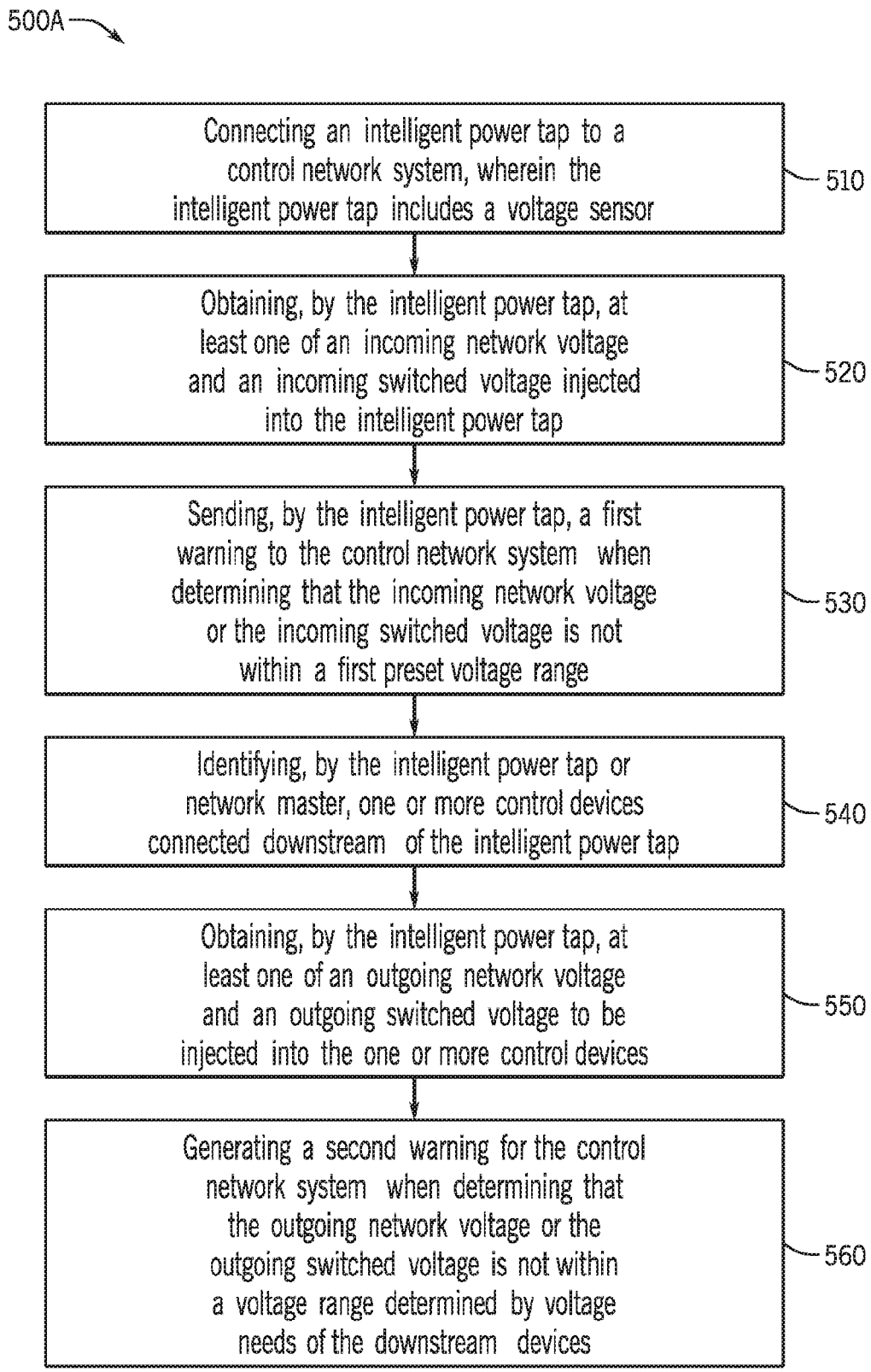
FIG. 5 illustrates an example flow chart according to one or more embodiments of the instant application.

FIG. 5 illustrates an example flow chart according to one or more embodiments of the instant application. The method 500A may be implemented by the intelligent power tap disclosed above. The method 500A may include additional acts if needed. It is not required that the acts in the flow chart to be executed as the specified order.

In act 510, an intelligent power tap is connected to a control network system, wherein the intelligent power tap comprises a voltage sensor. In act 520, the intelligent power tap obtains at least one of an incoming network voltage and an incoming switched voltage injected into the intelligent power tap. In act 530, the intelligent power tap sends a first warning to the control network system when determining that the incoming network voltage or the incoming switched voltage is not within a first preset voltage range.

In act 540, the intelligent power tap or network master identifies one or more control devices connected downstream of the intelligent power tap, based upon the geographical location information provided to the network system by those downstream devices. In act 550, the intelligent power tap obtains at least one of an outgoing network voltage and an outgoing switched voltage to be injected into the one or more control devices. In act 560, the intelligent power tap generates a second warning for the control network system when determining that the outgoing network voltage or the outgoing switched voltage is not within a voltage range determined by voltage needs of the downstream devices.

Figure 6:
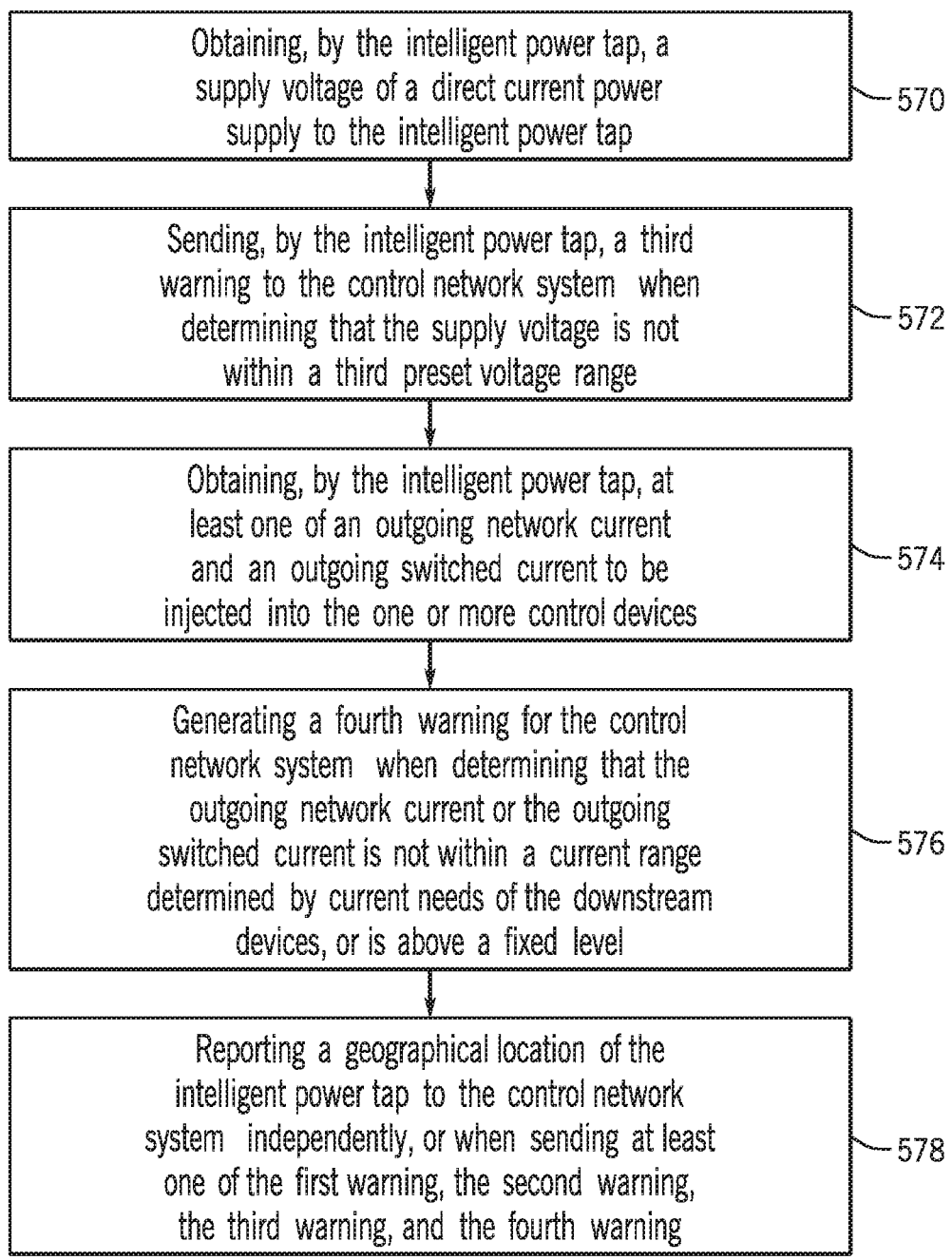
FIG. 6 illustrates additional acts in an example flow chart according to one or more embodiments of the instant application.

FIG. 6 illustrates additional acts in an example flow chart according to one or more embodiments of the instant application.

In act 570, the intelligent power tap obtains a supply voltage to the intelligent power tap. In act 572, the intelligent power tap sends a third warning to the control network system when determining that the supply voltage is not within a third preset voltage range. In act 574, the intelligent power tap obtains at least one of an outgoing network current and an outgoing switched current to be injected into the one or more control devices. In act 576, the intelligent power tap generates a fourth warning for the control network system when determining that the outgoing network current or the outgoing switched current is not within a current range determined by current needs of the downstream devices, or is above a fixed level. In act 578, the intelligent power tap reports a geographical location of the intelligent power tap to the control network system independently, or when sending at least one of the first warning, the second warning, the third warning, and the fourth warning.

The intelligent power tap enables a user to inject Switched and/or Network power into a network system; if some simple but essential electronics (micro & physical layer) are added to the power tap, and this circuitry is electrically connected to the communication network, the intelligent power tap is capable of communicating on a communication network. Such communication capability enables the power tap to be configured by, controlled by, and/or communicate with a Master and/or peer devices. The microcontroller, along with some additional sensing circuitry, would further enable the Power Tap to sense the incoming 24 Vdc voltage and/or current, as well as the outgoing NP and/or SP current and/or voltage; these diagnostics could be subsequently communicated onto the network.

An intelligent power tap could provide warning prognostics when/if the incoming voltage, or outgoing NP and/or SP voltage and/or current dips and/or exceeds a pre-defined default or user configured set point The present disclosure describes embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

The described features, structures, or characteristics of the embodiments may be combined in any suitable manner in one or more embodiments. In the description, numerous specific details are recited to provide a thorough understanding of embodiments of the disclosure. One skilled in the relevant art will recognize, however, that the embodiments may be practiced without one or more of the specific details, or with other methods, components, materials, and so forth. In other instances, well-known structures, materials, or operations are not shown or described in detail to avoid obscuring aspects of the disclosure.

Although the above discussion discloses various exemplary embodiments of the disclosure, it should be apparent that those skilled in the art can make various modifications that will achieve some of the advantages of the disclosure without departing from the true scope of the disclosure.

We claim:

1. An intelligent power tap in a network system, comprising:
    a circuit board;
    a microcontroller disposed on the circuit board, wherein the microcontroller is configured to provide a status report of the intelligent power tap and send prognostics information to a network node in the network system, the prognostics information comprises an over-current warning based on a self identification of a zone device and its current characteristics;
    a physical layer network interface connected to the microcontroller and the network system,
    a voltage sensor that senses at least one of a network voltage and a switched voltage to be injected into the network system; and
    a current sensor that senses at least one of a network current and a switched current to be injected into the network system,
    wherein the intelligent power tap is configured to inject at least one of a network power and a switched power into the network system,
    wherein the network node includes a geographical location on the network system of the intelligent power tap.

2. The intelligent power tap of claim 1, wherein the microcontroller communicates as a network node via a network bus connected to a physical layer of the network system; and
    wherein the microcontroller is configured to allow the geographical location of the intelligent power tap to be determined in the network system.

3. The intelligent power tap of claim 1, further comprising:
    one or more options that are configurable over the network system, wherein the options comprises at least one of the following:
    a first option for controlling the network power;
    a second option for controlling the switched power;

a third option for whether to provide diagnostic information in the status report; and
a fourth option for whether to provide prognostic information in the status report.

4. The intelligent power tap of claim 1, wherein the microcontroller is configured to receive diagnostics information from the voltage sensor and the current sensor in real time and send the diagnostics information to the network node in the network system.

5. The intelligent power tap of claim 1, wherein the prognostics information comprises at least one of the following:
an over-voltage warning when at least one of the network voltage and the switched voltage is greater than a preset upper voltage limit;
an under-voltage warning when at least one of the network voltage and the switched voltage is lower than a preset lower voltage limit;
an over-current warning when at least one of the network current and the switched current is greater than a preset upper current limit; and
an under-current warning when at least one of the network current and the switched current is lower than a preset lower current limit.

6. The intelligent power tap of claim 5, further comprising a user-input interface configured to receive current characteristics of a zone device,
wherein the prognostics information comprise: a second over-current warning based on the current characteristics of the zone device provided via the user-input interface.

7. The intelligent power tap of claim 1, further comprising:
a first switch configured to shut off the network power into the network system based on a first command received from the microcontroller; and
a second switch configured to shut off the switched power into the network system based on a second command received from the microcontroller.

8. The intelligent power tap of claim 1, further comprising:
a 24V voltage input that provides power to the microcontroller, the network power, and the switched power; and
an internal fuse holder that holds a replaceable fuse connected to the 24V voltage input.

9. The intelligent power tap of claim 1, further comprising:
a network power output that outputs the network power into the network system; and
an internal fuse holder that holds a replaceable fuse connected to and protecting the network power output.

10. The intelligent power tap of claim 1, further comprising:
a switched power output that outputs the switched power into the network system; and
an internal fuse holder that holds a replaceable fuse connected to and protecting the switched power output.

11. A system comprising:
a network power zone comprising one or more devices;
a switched power zone;
an intelligent power tap configured to inject network power to the network power zone; the intelligent power tap comprises:
a circuit board;
a microcontroller disposed on the circuit board; the microcontroller configured to send prognostics information to a network node in the network system, the prognostics information comprises an over-current warning based on a self identification of a zone device and its current characteristics;
a physical layer network interface connected to the microcontroller and a physical network;
a voltage sensor that senses at least one of a network voltage and a switched voltage to be injected into the network system; and
a current sensor that senses at least one of a network current and a switched current to be injected into the network system, and
a master device connected to the intelligent power tap,
wherein the intelligent power tap is configured to provide geographical location of the intelligent power tap to the master device.

12. The system of claim 11, wherein the switched power zone at least partially overlaps with the network power zone; and
wherein the intelligent power tap is further configured to inject switched power to the switched power zone.

13. A method for providing diagnostic information, comprising:
connecting an intelligent power tap to a control network system, wherein the intelligent power tap comprises a voltage sensor;
obtaining, by the intelligent power tap, at least one of an incoming network voltage and an incoming switched voltage injected into the intelligent power tap;
sending, by the intelligent power tap, a first warning to the control network system when determining that the incoming network voltage or the incoming switched voltage is not within a first preset voltage range;
identifying, by the intelligent power tap or network master, one or more control devices connected downstream of the intelligent power tap;
obtaining, by the intelligent power tap, at least one of an outgoing network voltage and an outgoing switched voltage to be injected into the one or more control devices; and
generating a second warning for the control network system when determining that the outgoing network voltage or the outgoing switched voltage is not within a voltage range determined by voltage needs of the downstream devices.

14. The method of claim 13, further comprising:
obtaining, by the intelligent power tap, a supply voltage of a direct current power supply to the intelligent power tap; and
sending, by the intelligent power tap, a third warning to the control network system when determining that the third voltage is not within a third preset voltage range.

* * * * *